July 23, 1968  L. E. ROBERTS  3,394,401

FLUID SYSTEM SAFETY DEVICE

Filed April 13, 1966

United States Patent Office 3,394,401
Patented July 23, 1968

3,394,401
FLUID SYSTEM SAFETY DEVICE
Lincoln Edwin Roberts, Harrisburg, Pa., assignor to AMP Incorporated, Harrisburg, Pa.
Filed Apr. 13, 1966, Ser. No. 542,353
7 Claims. (Cl. 200—82)

ABSTRACT OF THE DISCLOSURE

A pressure responsive switch for signaling the loss of pressure within the braking system of a motor vehicle wherein a dual master cylinder supplies fluid substantially independently to the front wheel brakes and the rear wheel brakes of the vehicle.

---

Figure 1:
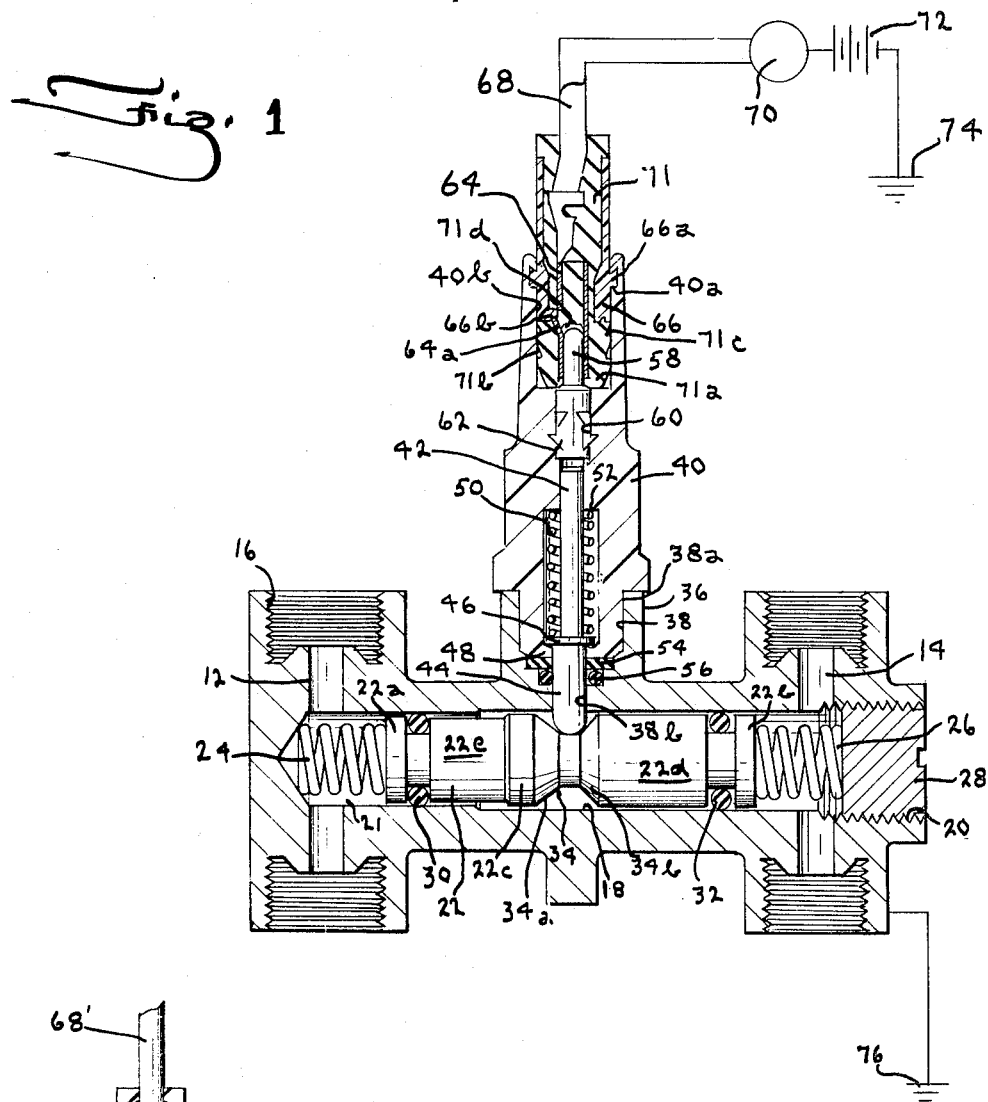

This invention relates to a fluid system safety device and more particularly to a pressure responsive switch for signaling the loss of pressure within the braking system of a motor vehicle or the like.

Conventional braking systems in most motor vehicles employ a master cylinder which directs fluid to the front and rear wheel brakes of the vehicle. If a leak should occur anywhere in the system there will be a pressure loss throughout the system with the result that the brakes on all four wheels of the vehicle will be inoperative. To correct this situation modern vehicles employ a braking system wherein a dual master cylinder is employed which cylinder has two hydraulic or pneumatic working chambers to supply fluid independently to the front wheel brakes and the rear wheel brakes. Therefore if a leak should occur in the line going to the front wheel brakes, for example, there will be no pressure loss in the line going to the rear wheel brakes and therefore the vehicle will be capable of coming to a safe stop.

In systems utilizing a dual master cylinder it is highly desirable to provide a means whereby the operator of the vehicle will be warned if there is a leakage in either one of the fluid lines so that this condition can be immediately corrected.

It is therefore a principal object of the present invention to provide a means for sensing the loss of pressure in one of the fluid lines leading to the brakes of a motor vehicle to thereby provide a warning signal to the operator of the vehicle.

A further object is to provide a signaling device which is readily adaptable to braking systems utilizing a dual master cylinder arrangement.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purpose of illustration in order that others skilled in the art may fully understand the invention and the principles thereof and the manner of applying it in practical use so that they may modify it in various forms, each as may be best suited to the conditions of a particular use.

Figure 2:
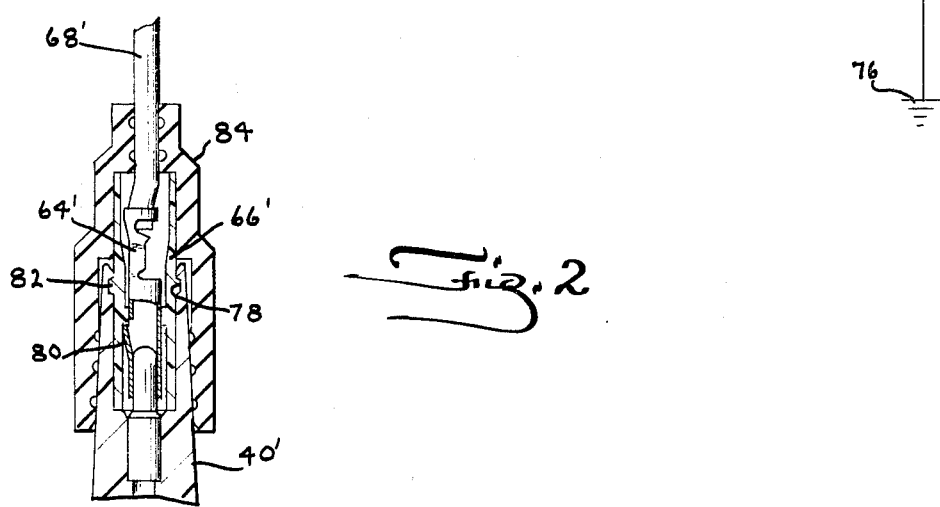

In the drawings, in which like reference numerals refer to like parts:

FIGURE 1 is a cross-sectional view of a signaling device made in accordance with the teachings of the present invention; and FIGURE 2 is a fragmentary cross-sectional view showing an alternative embodiment of a portion of FIGURE 1.

With reference to FIGURE 1 there is shown a body member 10 made of a suitable metallic material and having a pair of passageways 12 and 14 extending therethrough. The passageways are threaded at their ends as indicated at 16 to threadably receive coupling members secured to the fluid lines extending between the master cylinder of the vehicle and the front and rear wheel brake mechanisms. By way of example the passageway 12 may be interposed in the fluid line passing between the master cylinder and the front wheel brakes while the passageway 14 may be interposed in the fluid line passing between the master cylinder and the rear wheel brakes, or vice versa.

A cylindrical aperture 18 is disposed in body member 10 and communicates with the passages 12 and 14. The aperture 18 is threaded at one end as indicated at 20 and has a reduced diameter portion at its inner or opposite end as indicated at 21. A shuttle member 22 is disposed within aperture 18 for linear movement therein. The shuttle member may be provided with biasing springs 24 and 26 at its opposite ends, these springs normally biasing the shuttle member 22 to a central position between the passageways 12 and 14. If the biasing springs 24 and 26 are not used the shuttle may be positioned mechanically with hydraulic pressure being exerted on one end. The threaded portion 20 is provided for receiving a plug nut 28 to thereby retain the shuttle 22 within the aperture.

Shuttle 22 is provided with a pair of end flanges 22a and 22b and a pair of circumferential grooves 30 within which are disposed suitable sealing means such as the O-rings 32. Flanges 22a and 22b are of unequal diameter in accordance with the variations in the diameter of aperture 18. The O-ring disposed in the reduced diameter portion 21 of aperture 18 is smaller than the O-ring disposed in the large diameter portion of aperture 18. The O-rings provide a fluid seal to maintain the separation between the fluid lines passing to the front wheel brakes and the rear wheel brakes. At the central portion of shuttle 22 there is provided a relieved portion 34 having sloping sides 34a and 34b. The slope of side 34a is more gradual than that of side 34b for a reason to be described. Sides 34a and 34b blend into large diameter portions 22c and 22d respectively of the shuttle member. Section 22c narrows down into a portion 22e, the portion 22e being of a size to be receivable within the reduced diameter portion 21 of the aperture 18.

Body member 10 is provided with a boss 36 having a stepped opening 38 extending therethrough and communicating with the aperture 18. A hollow non-metallic switch body 40 is disposed within the opening 38a and secured therein by suitable means such as threads. A plunger 42 is disposed within the switch body 40 and is capable of limited sliding movement relative thereto. Plunger 42 is normally biased so as to have an end 44 extending beyond the end of the switch body 40 through the opening 38b. The opening 38b extends into the aperture 18 and therefore presents a sharp surface within the wall of the aperture. It is for this reason that the left hand side of shuttle 22, as viewed in FIGURE 1, is made of a reduced diameter. If the shuttle did not have a reduced diameter portion the O-ring 32 on the left hand side of the shuttle would be seriously cut up as it passed by opening 38b during assembly of the device and the O-ring would therefore be an ineffective seal. By reducing the diameter of the left hand portion of the shuttle the left hand O-ring 32 is permitted to be smaller in diameter than the larger portion of aperture 18 and therefore the O-ring passes freely beneath opening 38b without contacting the sharp edge thereof.

Since the flange 22a is smaller in diameter than flange 22b an equal pressure in passageways 12 and 14 will result in a lower force being applied to flange 22a than to flange 22b. The amount of force developed in the shuttle 22 will determine movement of the shuttle and thereby movement of the plunger 42 as the plunger end 44 is cammed by engagement with the sides 34a and 34b of the relieved portion of the shuttle. Since a lower force will be developed against flange 22a the slope of side 34a is made more gradual than that of side 34b to compensate for this and to insure that the plunger 42 will respond in a like manner to the pressure developed in passageways 12 and 14.

A suitable flange 46 is provided on the plunger 42 to limit movement of the plunger externally of the switch body 40. A lip 48 extends around the lower end of switch body 40 and is in engagement with the flange 46 to thereby act as a stop means for the plunger. The lip 48 may be formed after the plunger 42 is inserted into the switch body 40 by applying heat to the end of body 40 to thereby allow the material to flow and to be shaped as desired. The biasing spring 50 extends between the flange 46 and a shoulder 52 formed internally of the switch body 40. The spring 50 thus normally exerts a downward force, as seen in FIGURE 1, on a plunger 42 to seat the plunger end 44 within the relieved portion 34 of the shuttle 22.

In order to insure against the possibility of fluid escaping from the system if either of seals 32 leak there is provided at the end of switch body 40 a sealing washer 54 and an O-ring 56, the washer and O-ring snugly engaging the sides of plunger end 44 and the sides of the stepped opening 38.

At the upper end of switch body 40 there is provided a conductive pin 58 which is placed within an opening 60 in the switch body 40 and is secured therein by means of a plurality of barbs 62 which will bite into the interior walls of switch body 40 to thereby prevent movement of the pin 58. As can be seen in FIGURE 1 the lower end of pin 58 is normally spaced a small distance from the upper end of the plunger 42.

A suitable electrical connector 64 is disposed within a housing 66 and retained therein by a lance 64a cooperating with a shoulder 66b on the housing. The housing 66 has a rim 66a which mates with a groove 40a disposed in the upper end of switch body 40. The connector 64 is disposed on the end of an electrical conductor 68 which leads to a suitable warning light 70 positioned preferably on a dash-board of a motor vehicle. A protective boot 71 is molded around the connector 64 and within the housing 66 and extends beyond the housing to provide a water tight seal and prevent damage to the electrical connection by salt spray or the like which may be thrown from the road onto the motor vehicle. The end 71a of the boot is adapted to be inserted into the enlarged aperture 40b at the top of switch body 40. The end 71a has a plurality of tapered and relieved portions 71b and 71c respectively to allow insertion of the boot within the switch body and to provide a firm engagement between the sides of the boot and the sides of the switch body to effect a water tight seal. An aperture 71d is provided in the end of the boot for receiving the conductive pin 58, which pin will be in firm electrical contact with the connector 64. The boot 71 may be made of rubber or polyvinyl chloride or some like material. The light 70 is electrically connected to the vehicle battery 72 and the electrical circuit is provided with appropriate grounds indicated at 74 and 76.

The operation of the device thus far described will now be set forth in detail. When the vehicle braking system is functioning properly there will be adequate fluid in the lines between the master cylinder and the front and rear wheel brakes and therefore the fluid pressure passing through passageways 12 and 14 will be approximately equal. In this condition the parts will be in the position shown in FIGURE 1 and the warning light 70 will not be lit since there is a break in the electrical circuit, namely the gap between the lower end of conductive pin 58 and the upper end of plunger 42. If a leak should occur in the fluid line passing to the front wheel brakes, for example, the fluid pressure in passageway 12 will decrease a predetermined amount below the pressure in passageway 14. The decrease in pressure in passageway 12 will allow the shuttle member 22 to move to the left as seen in FIGURE 1 against the bias of spring 24. As shuttle 22 moves to the left the plunger end 44 will be cammed out of the relieved portion 34 and will therefore be forced upwardly against the bias of spring 50. The upward movement of plunger 42 will cause the plunger to contact the pin 58 and thus complete the electrical circuit to send current through the warning light 70. When the light appears on the dash-board of the vehicle the operator will immediately know that one of the brake lines is losing fluid. The operator will then have the opportunity to run the vehicle on the one remaining brake line until the vehicle can be repaired.

Should a leak occur in the fluid line leading to the rear wheel brakes a similar sequence of events will occur. The pressure will drop in passageway 14 allowing shuttle 22 to move to the right thereby camming plunger end 44 out of the relieved portion 34 to thereby move plunger 42 upwardly into contact with the pin 58 to again complete the electrical circuit and energize the warning light 70.

The warning light 70 will remain on until the vehicle is repaired. As soon as pressure is restored in the faulty brake line the pressure in passageways 12 and 14 will again return to normal and the shuttle 22 will assume its normal intermediate position allowing plunger 42 to drop back into relieved portion 34 thus extinguishing the light 70.

In the embodiment shown in FIGURE 2 the switch body 40' is provided at its upper end with a circumferential recess 78. The electrical connector 64' is mounted within the housing 66' and held therein by a spring lance 80. The housing 66' has a circumferential rib 82 which locks within the recess 78 to thereby provide a firm engagement between the connector housing 66' and the switch body 40'. A boot 84 is disposed around the connector housing 66' and snugly engages the sides of switch body 40' and the electrical conductor 68'. Boot 84 is preferably made of rubber or like material to thereby provide a protective covering around the connection to protect the connection from water, salt spray, etc. which are often present underneath a moving motor vehicle. The operation of the alternative embodiment of FIGURE 2 is identical to the operation of the device shown in FIGURE 1 and therefore will not be described.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. In a pressure responsive switch for signaling the loss of pressure within the braking system of a motor vehicle, a body member, said member having a longitudinal aperture extending therethrough, said longitudinal aperture having a first portion and a second portion, said first portion having a transverse cross-sectional area greater than the transverse cross-sectional area of said second portion, a transverse aperture disposed within said body member, said transverse aperture intersecting said longitudinal aperture in the first portion thereof, shuttle means disposed within said longitudinal aperture and having a first portion and a second portion disposed respectively in said longitudinal aperture first portion and longitudinal aperture second portion, and first and second sealing means surrounding said shuttle first portion and a second portion respectively and cooperating with said longitudinal aperture first portion and second portion respectively, said second sealing means having an outer periphery which is less than the inner periphery of said longitudinal aperture first portion whereby said second sealing means is maintained out of contact with said transverse aperture during assembly of said shuttle means within said longitudinal aperture.

2. In a pressure responsive switch as set forth in claim 1, wherein said shuttle first portion has a transverse cross-sectional area greater than said shuttle second portion.

3. A pressure responsive switch for signaling the loss of pressure within the braking system of a motor vehicle wherein a dual master cylinder supplies fluid substantially independently to the front wheel brakes and the rear wheel brakes of the vehicle, comprising in combination a body member having a pair of generally parallel passageways extending therethrough, one said passageway being for communication with the fluid passing from the master cylinder to the front wheel brakes, the second said passageway being for communication with the fluid passing between the master cylinder and the rear wheel brakes, a cylindrical aperture disposed within said body member and communicating at its ends with each said passageway, a shuttle member disposed within said aperture intermediate the said passageways, said shuttle member having a circumferential relieved portion intermediate the ends thereof, an opening disposed within said body member and communicating with said cylindrical aperture, a hollow switch body disposed within said opening, a plunger disposed within said switch body, means biasing said plunger to normally project from said switch body and into said relieved portion on said shuttle member, a pin member secured within the said switch body in alignment with said plunger, and normally spaced therefrom, connector means extending between said pin member and said warning signal, said connector means being disposed within an insulating housing, said connector means having a portion thereof in firm engagement with said pin member, and a protective boot extending around said connector housing and a portion of said switch body to prevent damage to said circuit, whereby a predetermined difference in pressure between the fluid lines leading to the front and rear wheel brakes of the vehicle will cause linear movement of said shuttle member to thereby cause said plunger to move out of said relieved portion at approximately right angles to the movement of said shuttle member to thereby cause said plunger to contact said pin member and thereby complete the electrical circuit to operate said warning signal.

4. A pressure responsive switch for signaling the loss of pressure within the braking system of a motor vehicle wherein a dual master cylinder supplies fluid substantially independently to the front wheel brakes and the rear wheel brakes of the vehicle, comprising in combination a body member having a pair of generally parallel passageways extending therethrough, one said passageway being for communication with the fluid passing from the master cylinder to the front wheel brakes, the second said passageway being for communication with the fluid passing between the master cylinder and the rear wheel brakes, a cylindrical aperture disposed within said body member and communicating at its ends with each said passageway, a shuttle member disposed within said aperture intermediate the said passageways, said shuttle member having a circumferential relieved portion intermediate the ends thereof, an opening disposed within said body member and communicating with said cylindrical aperture, a hollow switch body disposed within said opening, a plunger disposed within said switch body, means biasing said plunger to normally project from said switch body and into said relieved portion on said shuttle member, a pin member secured within the said switch body in alignment with said plunger, and normally spaced therefrom, connector means extending between said pin member and said warning signal, said connector means being disposed within an insulating housing, a protective boot disposed between said connector means and said insulating housing, said boot having an end portion for reception within said switch body to permit engagement between said connector means and said pin member, whereby a predetermined difference in pressure between the fluid lines leading to the front and rear wheel brakes of the vehicle will cause linear movement of said shuttle member to thereby cause said plunger to move out of said relieved portion at approximately right angles to the movement of said shuttle member to thereby cause said plunger to contact said pin member and thereby complete the electrical circuit to operate said warning signal.

5. A pressure responsive switch for signaling the loss of pressure within the braking system of a motor vehicle wherein a dual master cylinder supplies fluid substantially independently to the front wheel brakes and the rear wheel brakes of the vehicle, comprising a substantially H-shaped body member having a pair of generally parallel passageways extending therethrough, one said passageway being for communication with the fluid passing from the master cylinder to the front wheel brakes, the second said passageway being for communication with the fluid passing from the master cylinder to the rear wheel brakes, a cylindrical aperture disposed within said body member at generally right angles to said parallel passageways and communicating at its ends with each said passageway, a shuttle member disposed within said aperture intermediate the said passageways, said shuttle member having a circumferential relieved portion intermediate the ends thereof, one end of said shuttle member and said cylindrical aperture being of smaller diameter than the opposite end of said cylindrical aperture and said shuttle member for aiding in the assembly of said shuttle member within said body member, an opening disposed within said body member and communicating with said cylindrical aperture, said opening extending generally parallel to said parallel passageways, switch means disposed within said opening and comprising plunger means biased to normally project into said relieved portion on said shuttle member, said switch means further comprising contact means normally spaced from said plunger and adapted to be connected to a warning signal, whereby a pressure differential between said parallel passageways will cause the said shuttle member to move linearly within said cylindrical aperture to thereby cause said plunger means to move out of said relieved portion at approximately right angles to the movement of said shuttle member thereby causing said plunger means to engage said contact means thereby completing the electrical circuit to operate said warning signal.

6. A pressure responsive switch as set forth in claim 3 further comprising a circumferential recess formed in one end of said switch body and a circumferential rib formed in said connector housing, said rib being engageable within said recess to secure said connector housing relative to said switch body.

7. A pressure responsive switch as set forth in claim 4 wherein said boot end has a plurality of tapered surfaces to facilitate insertion of said end portion within said switch body.

References Cited

UNITED STATES PATENTS

| 3,309,966 | 3/1967 | Cornillaud. | |
| 2,535,940 | 12/1950 | Malvin | 200—82 |
| 2,764,176 | 9/1956 | Darquier | 303—84 |
| 3,171,916 | 3/1965 | Solski et al. | 200—82 |

BERNARD A. GILHEANY, *Primary Examiner.*

H. BROOME, *Assistant Examiner.*